Jan. 23, 1968   B. FISCHER   3,365,209
COLLAPSIBLE SLED
Filed July 27, 1965   2 Sheets-Sheet 1
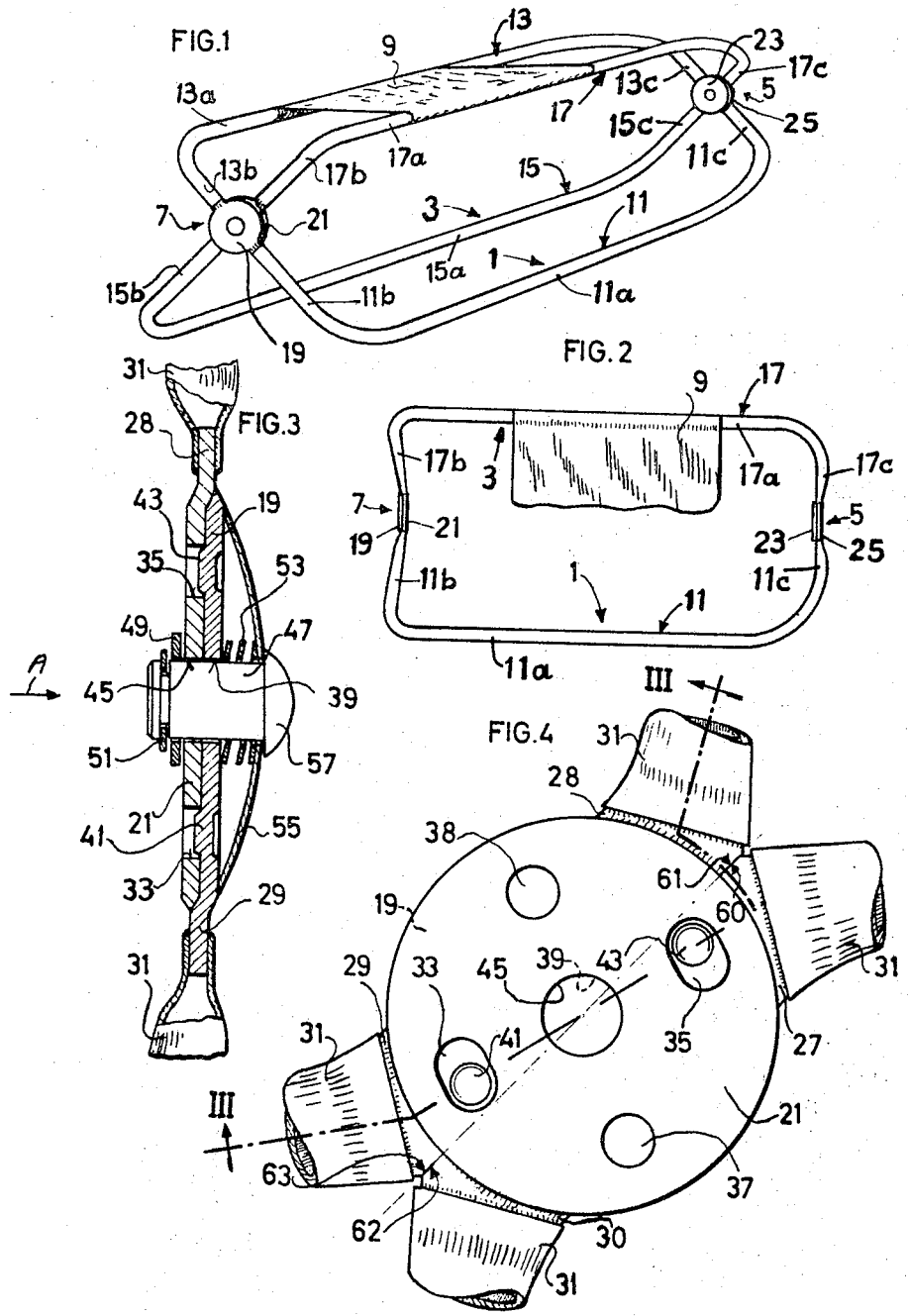
INVENTOR.
Benedikt Fischer Jan. 23, 1968

B. FISCHER 3,365,209

COLLAPSIBLE SLED

Filed July 27, 1965

INVENTOR.
Benedikt Fischer
BY

United States Patent Office 3,365,209
Patented Jan. 23, 1968

1

3,365,209
COLLAPSIBLE SLED
Benedikt Fischer, 8 Hohfurrenstrasse, Zollikerberg,
Zurich, Switzerland
Filed July 27, 1965, Ser. No. 475,148
3 Claims. (Cl. 280—20)

ABSTRACT OF THE DISCLOSURE

In a collapsible sled, two substantially endless and ordinarily longitudinally extending frame members are connected to each other at their ends by two joints for swinging movements from an inoperative into an operative position and vice versa. Each joint consists of two superposed disc members provided with complementary locking means. Spring means individually acting upon the disc members of each of the joints ensure safe locking in the operative and inoperative position, respectively.

This invention relates to a collapsible sled.

Collapsible sleds are known. The known collapsible sleds have the disadvantages of benig complex in their construction, unwieldy when in collapsed condition, and expensive to manufacture.

The primary object of my invention is to generally improve collapsible sleds.

More specific objects of the invention center about a collapsible sled which is simple in its construction and inexpensive to manufacture, and permits easy handling when collapsed, and easy conversion, even under icy conditions, from the operative, open, or sledding condition into the inoperative, collapsed, or transporting condition, and vice versa.

The referred to objects of this invention and such other objects as will be apparent from the following description are achieved by providing a collapsible sled which comprises, broadly speaking, two frame members and two joints. The frame members have two ends and are rotatably connected to each other at each of the ends by means of one of the two joints. The joints permit the frames to be swung from an operative into an inoperative position, and vice versa. The frames are in their operative position when the sled is open or in its sledding condition, whereas in the inoperative position of the frames the sled is collapsed ready to be transported to or from the place of use as a vehicle.

More specifically, my sled comprises, in addition to the referred to two joints, two pairs of bows. Each of the four bows has two end portions, and each of the two joints connects a group of four bow end portions. Both of the joints form a seemingly endless frame out of each of the two pairs of bows and permit the two frames thus formed to perform the swinging movements referred to hereinbefore.

The specification is accompanied by drawings in which:

FIG. 1 is a perspective rear view of a sled embodying features of the invention, the sled being shown in open or sledding condition;

FIG. 2 shows the sled of FIG. 1 in collapsed or transporting condition;

FIG. 3 is a section taken in the plane of the line III—III of FIG. 4;

FIG. 4 is an end elevation of the sled when in open condition, with parts removed, viewed in the direction of the arrow A shown in FIG. 3 and drawn to enlarged scale; and

2

Figure 5:
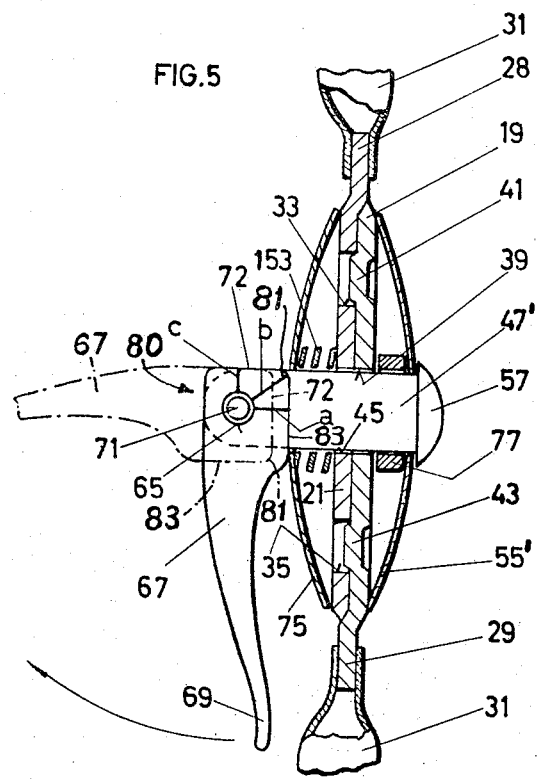

FIG. 5 is a view similar to that of FIG. 3, showing a modified construction.

Referring to the drawings in greater detail now, and initially to FIGS. 1 to 4, my sled includes two frames 1 and 3 which have a front end and a rear end and are connected to each other for swinging movements by a front joint 5 and a rear joint 7. Each of the frames 1 and 3 consists of two halves or bows 11, 13 and 15, 17, respectively. The bows 11, 13 and 15, 17 are preferably made of hollow light-weight rods. A piece 9 of pliable material serves as a seat. The bow 11 includes a runner 11a and two end members 11b and 11c, while the bow 13 includes a seat-supporting member 13a and two end members 13b and 13c. The bows 15 and 17 which are similarly made up are formed by parts 15a, 15b, 15c and 17a, 17b, 17c, respectively. The seat-supporting members 13a and 17a extend longitudinally as the runners 11a and 15a do. The end members 13b, 17b and 13c, 17c are shorter than the end members 11b, 15b and 11c, 15c so that the distance between the runners 11a and 15a will be larger than that between the rods 13a and 17a, which ensures greater stability of the open sled.

The frames 1 and 3 are fastened together by rotatably mounted discs 19, 21 and 23, 25, respectively. The former are parts of the rear joint 7, while the latter are parts of the front joint 5. Each of the four discs is provided with two approximately oppositely directed short arms. The discs 19 and 21 are shown in FIGS. 3 and 4 to be provided with arms 27, 29 and 28, 30, respectively. The arms 27 to 30 serve to receive end portions 31 of the end members 11b, 13b, 15b, 17b. The hollow end portions 31 are pressed onto the arms 27 to 30. Similarly, the short arms of the front discs 23, 25 receive end portions of the end members 11c, 13c, 15c, and 17c.

Out of the pairs of discs 19, 21 and 23, 25, the discs 21 and 23 are on the inside. The disc 21 is shown to be provided with two oval apertures 33, 35, two circular apertures 37, 38, and a central bore 45. The apertures 33 and 35 are diametrically opposed and equidistant from the center of the superposed discs 19, 21, and so are the apertures 37 and 38.

The discs 19 and 25 of the two pairs of discs are on the outside. The disc 19 is shown to be provided with two wartlike protuberances 41, 43 and a central bore 39. The warts 41, 43 are diametrically opposed and are the same distance away from the center of the two adjacent discs 19, 21 as are the oval apertures 33 and 35.

When assembling the joints 5 and 7, the discs 19, 21 and 25, 23, respectively, are placed upon each other so that in the case of the discs 19, 21 the protuberances 41, 43 of the disc 19 will enter the oval apertures 33 in the disc 21. A bolt 47 passes through the registering bores 39 and 45.

The bolt 47 has near its inner end an annular depression in which a holding ring 51 is received, and carries outwardly thereof, but inwardly of the inner disc 21, a spring ring 49 (see FIG. 3). Outwardly of the outer disc 19, the bolt 47 is surrounded by a compression spring 53 which bears against the disc 19 and a cover 55. A head 57 of the bolt 47 is formed as a rivethead or may be screwed on the bolt. A rivet provided with an abutment near its free end may be used instead of the bolt 47 and holding ring 51. Such rivet constitutes a connection of two superposed discs, which is nondetachable.

The operation of the sled of FIGS. 1 to 4 is as follows:

In the fully open position of the sled, the arms 27, 28, as can be seen from FIG. 4, lean against each other across surfaces 60, 61, and similarly lean the arms 30, 31 against each other across surfaces 62, 63. From FIG. 3 it will be clear that the arms 27 to 30 are offset with respect to the plane of the respective disc so as to properly serve as attachment means for the frames 1 and 3. The surfaces 60, 61 and 62, 63 extend perpendicularly to the swinging directions of the frames 1 and 3. In the open position of the sled, with the frames crossing each other, the perpendicular surfaces of adjacent arms abut against each other. This mutual abutment prevents the sled, while in use or ready for use, from being unintentionally swung beyond a predetermined open positon, which would happen when the seat breaks and could readily result in unpleasant and dangerous accidents. Normally, it is the width of the seat material 9, that determines the degree to which the sled is to be opened for use. The meeting surfaces 60 to 63 may be provided as a safety arrangement so as to limit the opening at the point that is determined by the width of the seat, or at a point beyond the thus determined point.

The oval shape of the apertures 33, 35 in which the wart 41 and 43, respectively, is received offer some resilience in the connection of the frames 1 and 3 in their open position, which is a feature that is welcome to the user of the sled.

In order to collapse the sled, the frames 1 and 3 are swung toward each other until they are practically in a superposed condition. The main portions of the end members 11b to 17b and 11c to 17c, respectively, lie in substantially parallel planes. Prior to the collapsing, it is necessary to move the discs 19 and 21 from each other, against the force of the spring 53, by a distance which corresponds at least to the height of the warts 41, 43. The discs can only be turned after disengagement of the warts 41, 43 from the otherwise confining apertures 33, 35. Since a large pulling and pushing force can readily be applied over the end members 11b, 13b, 15b, 17b and 11c, 13c, 15c, 17c it is easy to overcome even a relatively large spring force and to swing the frames toward each other.

When the frames are brought into the collapsed condition, the warts 41 and 43, biased by the spring 53, snap into the round apertures 37 and 38, which will lock the sled in its inoperative position. When in this position, the sled cannot be unlocked, unless some force is used.

In the embodmient shown in FIG. 5 which shows a joint joining the two frames of my sled in the operative sled condition, a portion at the free end of a bolt 47' is slotted longthwise and provided with a transversely extending bore 65. Received in the slot in the bolt 47' and fastened to the bolt for swinging movements by means of a pin 71 is a hand lever 69. The pin 71 passes through the bore 65. A portion 80 of the lever 69 at the end at which the lever is connected to the bolt 47' is formed as a cam, with the dimensions of the cam being $b > a > c$. The cam when in the position shown in solid lines rests on a cover 75. A compression spring 153 surrounds the portion of the bolt 47', which extends between the cover 75 and the interior disc 21, and there is a spacing ring 77 between the exterior disc 19 and a cover 55'.

To collapse a sled using the joint of FIG. 5, the lever 69 is swung clockwise, that is, from the solid line to the broken line position. During this rotative movement, first the corner portion 81 of the cam 80, at the free end of the radius $b$, presses upon the cover 75 and compresses the spring 153, until, on continued rotation of the lever 69, the pressure exerted on the spring 153 is released. In the broken line position of the lever 69, the side 83 of the cam 80, which previously leaned against the cover 75 is remote from the cover. The pressure of the discs 19 and 21 upon each other is released to such an extent that the sled can effortlessly be collapsed. When in collapsed condition, the lever 67 may be returned to the solid line position to again compress the spring 153 and to secure the two discs of both the front and rear joint, and the sled, in assembled condition. The embodiment of FIG. 5 offers the advantage of preventing a sled from collapsing under the influence of a relatively small force unintentionally.

It is believed that the construction and operation of the forms of my sled, as described hereinbefore, and the many advantages thereof, will be fully understood from the foregoing detailed description. Some of the features of the sled are briefly reviewed hereinafter.

The discs and their arms, such as, for instance, the disc 19 and its arms 28 and 30, together with the apertures in the discs, are preferably made by stamping. The frames are connected with the arms by slipping portions of the end members of the frames, at the free ends of those portions, over the arms, and by welding together the joining edge portions of the arms and end members, as is indicated in FIG. 3. As can be seen from FIG. 2, the free end portions of the end members may be narrowed to closely fit the arms.

It is preferable to give the front of the sled a pointed shape, which will increase the steadiness of the sled against impact from the front. The joint of the two frames in the front of the sled increases also the strength of the sled to a great extent, which is important as far as frontal collisions are concerned. It is the front joint which is especially resistant to frontal blows and hits.

The construction of my sled permits the provision of carrying means and a pulling cord on the frames and of a pocket for gloves and other articles on the seat cloth.

The end members 11b, 13b, etc. and 11c, 13c, etc. have main portions, and the main portions of the two groups of four end members lie in parallel or approximately parallel planes.

A great advantage of the present sled is to be seen in its simplicity in construction and in the manner of setting up and collapsing the sled. The sled includes two pairs of bow-shaped rods. Even though the bows of one and the same pair are preferably different, the bows of one of the pairs and the bows of the other pair are identical. The sled includes further two pairs of identical discs, identical connecting arms, and identical spring-biased connections of adjacent discs. The arms are advantageously made as integral parts of the discs.

If made of nylon rubber-coated on both sides, the seat forms an elastic and strong seating support.

It will be apparent that while I have shown and described my invention in two forms only, many changes and modifications may be made without departing from the spirit of the invention defined in the following claims.

I claim:

1. A collapsible sled comprising
   (1) two frame members and
   (2) two joints,
      (a) said frame members having two ends and being pivotally connected to each other at each of said ends by one of said joints, said joints permitting said frame members to be swung relative to each other from an operative or open position into an inoperative or collapsed position, and vice versa, each of said joints including
      (b) two disc members rotatably connected in a superposed condition, and provided with two sets of complementary means for respectively locking said disc members in said operative and said inoperative position, each of said frame members terminating at each of said ends in
      (c) two end members, each of said disc members being provided with
      (d) a pair of approximately oppositely directed arms, each of said arms being connected to one of said end members, each arm of each disc of a pair of superposed discs being formed to abut in the operative sled position against an arm of the other disc of said pair, and
      (e) spring means, the spring means of each of said joints acting independently and normally urging one of said sets of complementary means into locking engagement with the other set.

2. In the sled according to claim 1, each of said disc members being constituted by a disc, each arm of each disc of a pair of superposed discs being offset with respect the plane of the respective disc.

3. In the sled according to claim 1, each of said joints further including a cover and camming means, said spring means being interposed between said cover and one of said superposed disc members, said camming means being supported so as to be adapted to act in one position thereof upon said cover and to urge said disc members over said spring means into locking engagement, and to release in another position the force of said spring means and thus to allow said disc members to be rotated relative to each other.

References Cited

UNITED STATES PATENTS

| | | | |
|---|---|---|---|
| 68,534 | 9/1867 | Shaaber | 280—20 |
| 1,209,679 | 12/1916 | Decker | 108—118 |
| 3,157,136 | 11/1964 | Moody | 108—118 |

FOREIGN PATENTS 137,910  3/1929  Switzerland.

BENJAMIN HERSH, *Primary Examiner.*

LEO FRIAGLIA, L. D. MORRIS, *Examiners.*